(12) United States Patent
Balakrishnan et al.

(10) Patent No.: US 6,904,327 B2
(45) Date of Patent: Jun. 7, 2005

(54) INTEGRATED CONTROL SYSTEM TO CONTROL ADDRESSABLE REMOTE DEVICES

(75) Inventors: Jayashree Balakrishnan, Bangalore (IN); Premraj K Mannikkath, Bangalore (IN); Raghavendra T S Prasad, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 220 days.

(21) Appl. No.: 10/353,658

(22) Filed: Jan. 29, 2003

(65) Prior Publication Data

US 2004/0148135 A1 Jul. 29, 2004

(51) Int. Cl.⁷ .............................................. G06F 19/00
(52) U.S. Cl. ........................... 700/95; 700/88; 709/208; 713/100
(58) Field of Search ............................. 700/87, 88, 83, 700/95–97, 2, 5, 19; 709/208, 221; 713/100, 2; 702/188

(56) References Cited

U.S. PATENT DOCUMENTS

| | | | |
|---|---|---|---|
| 5,768,119 A | | 6/1998 | Havekost et al. |
| 5,862,052 A | | 1/1999 | Nixon et al. |
| 6,195,591 B1 | | 2/2001 | Nixon et al. |
| 6,298,377 B1 | | 10/2001 | Hartikainen et al. |
| 6,370,448 B1 | * | 4/2002 | Eryurek ...................... 700/282 |
| 6,371,701 B1 | * | 4/2002 | Blankenship et al. ......... 408/14 |
| 2002/0013629 A1 | | 1/2002 | Nixon et al. |
| 2002/0147511 A1 | | 10/2002 | Eryurek et al. |
| 2002/0163427 A1 | | 11/2002 | Eruyek et al. |
| 2003/0109937 A1 | * | 6/2003 | Zielinski et al. ............... 700/1 |
| 2003/0200060 A1 | * | 10/2003 | Eryurek et al. ............. 702/188 |

OTHER PUBLICATIONS

"HART Field Communications Protocol Specification HCF_SPEC–12 Rev 6.0", Released on 18th Apr. 2001, avaliable from HART Communication Foundation, 9390 Research Boulevard, Suite I–350, Austin, Texas 78759, USA (http://www.hartcomm.org).

* cited by examiner

*Primary Examiner*—Kidest Bahta
(74) *Attorney, Agent, or Firm*—Naren Thappeta; Anthony Miologos (57) ABSTRACT

A multiplexer implemented substantially in the form of software, which enables the multiplexer to be integrated with a supervisory platform into one unit is disclosed. The multiplexer may contain a database which stores a mapping of the address of the devices to the corresponding port/channels to which the devices are connected. An emulation block implemented in software examines the address in each command/response and forwards the command/response appropriately. Due to the software implementation, some of the commands may be blocked (from being forwarded). According to another aspect, data required to generate a response may be retrieved from a controller block (instead of retrieving from the device), thereby reducing the overhead on the devices.

29 Claims, 6 Drawing Sheets

INTEGRATED CONTROL SYSTEM TO CONTROL ADDRESSABLE REMOTE DEVICES

BACKGROUND OF THE INVENTION

1. Field of the Invention

The present invention generally relates to control systems used in manufacturing plants, and more specifically to a method and apparatus for implementing an integrated control system to control addressable remote devices used in such plants.

2. Related Art

Control systems generally coordinate and control the operation of various remote devices (also referred to as field instruments) to implement a desired process in environments such as manufacturing plants. Each device in turn contains components such as sensors (which measure various variables such as temperature, flow, pressure, etc.), control elements (e.g., valves, switches), and transmitters (which transmit any desired information).

The decision to operate various control elements is often based on the state (or status) of several variables (e.g., temperature, flow, pressure) in devices implementing a manufacturing process. Accordingly, sensors are generally implemented to monitor the states of interest and send the monitored information to a controller block. For example, a pressure transmitter measures pressure, a flow transmitter measures density and flow between two different positions and sends signals representing the measured parameters using a transmitter. The controller block may send control signals to the control elements (in the devices) based on the measured parameters to implement a desired manufacturing process.

Remote devices are often implemented to be addressable, i.e., an address is provided which identifies a corresponding device. Such an address is often used by systems such as asset management systems to send commands (directed to a specific device) and receive corresponding information. As is well known, an asset management system generally maintains various status related information (such as the device name, type, number of times the device has been used, the different states (e.g., temperature, pressure the device has been subjected to, etc.), and such status information is used for various operation management tasks such as scheduling maintenance.

Multiplexers are often used to enable all such communications between devices and asset management system. In general, a multiplexer forwards a command received from asset management system to one of the devices (as determined by an address in the command), and similarly forwards responses received from corresponding devices to the asset management system.

In an embodiment, multiplexers are implemented substantially in the form of hardware. In general, hardware based approaches do not provide for easy implementation of new features. For example, addition of a new feature in hardware-based implementations may require addition of new modules, which typically requires a lot more effort/cost than in software-based implementations.

Further more, hardware implementations are relatively expensive and also consume additional space. The cost and space requirements are compounded due to the use of multiple units for multiplexers, controller blocks, asset management systems, etc. Accordingly, what is needed is a method and apparatus which provides greater flexibility to add new features and/or minimize space/cost requirements.

SUMMARY

According to an aspect of the present invention, a multiplexer is implemented substantially in the form of software instructions. The multiplexer may contain an asset manager interface receiving commands from an asset management system directed to addressable remote devices implementing a manufacturing process. An emulation block (also contained in the multiplexer) implemented in the form of software instructions may determine a specific device to forward each command to, and forward the corresponding command to the determined specific device.

The software implementation enables additional features to be added easily. In addition, the overall cost of implementation of a control system may also be minimized due to the software implementation. The software implementation provides several other features as described below with several examples. In an embodiment, the requests and responses are generated according to HART protocol, well known in the relevant arts.

According to another aspect of the present invention, an emulation block contains a command handler and flow control block which determines whether the data to generate a response to a first command is available in a controller block. If the data is available in the controller block, a parameter access block retrieves the data from the controller block. In such a situation, the command handler and flow control block sends the response to the asset management system without accessing a corresponding device to which the first command is directed.

According to one more aspect of the present invention, a command handler and flow control block receives a second command and determines whether execution of the second command changes a configuration of a second device to which the second command is directed. The command handler and flow control block blocks (does not forward) the second command if the second device is operational (i.e., in control of a plant operation) and if execution of the second command changes the configuration (which could interfere with the control of the plant operations). As a result, undesirable configuration changes may be avoided.

In another embodiment of the present invention, a supervisory platform is integrated with multiplexer into a single unit (due to the implementation of multiplexer in the form of software instructions). Both the components may communicate with I/O cards on a shared path using protocols such as Control Net, well known in the relevant arts.

An embodiment of the multiplexer may contain a non_ volatile memory (e.g., database) storing a mapping of addresses of the devices to corresponding paths (e.g., port/ channel number on I/O cards). The non-volatile memory may be populated when the multiplexer is initialized.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

FIG. (FIG.) 1 is a block diagram illustrating an example environment in which the present invention can be implemented.

DETAILED DESCRIPTION OF THE PREFERRED EMBODIMENTS

1. Overview

According to an aspect of the present invention, a multiplexer (connecting addressable remote devices to an asset management system) and a supervisory platform (which directly interfaces with a controller block implementing a manufacturing process) are integrated into a single unit. Such an integration enables reduction of wiring requirements and cost of overall implementation of a control system. In addition, due to the availability of more information in a single unit, several advantages may be obtained as described in sections below with examples.

Another aspect of the present invention enables a multiplexer connecting addressable remote devices to an asset management system to be implemented substantially in the form of software. The software implementation may lead to lower cost and reduction in physical area/space requirements. The software implementation enables several other features, as described below in further detail.

According to one more aspect of the present invention, a multiplexer pre-fetches data from devices, and forwards the data when a command requesting the stored data is received. Due to such pre-fetching, commands can potentially be processed quickly.

Yet another aspect of the present invention ensures that the multiplexer can prevent undesirable re-configurations (e.g., the write commands from asset management system) of devices, particularly when the devices are operational (i.e., in control of a plant operation).

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well_known structures or operations are not shown in detail to avoid obscuring the invention.

Some aspects of the present invention may be clearly appreciated based on an understanding of an implementation of a control system, which does not implement at least some aspects of the present invention. Accordingly, such an implementation is described first below in detail.

2. Embodiment Not Implementing at Least Some Aspects of the Present Invention

Figure 1:
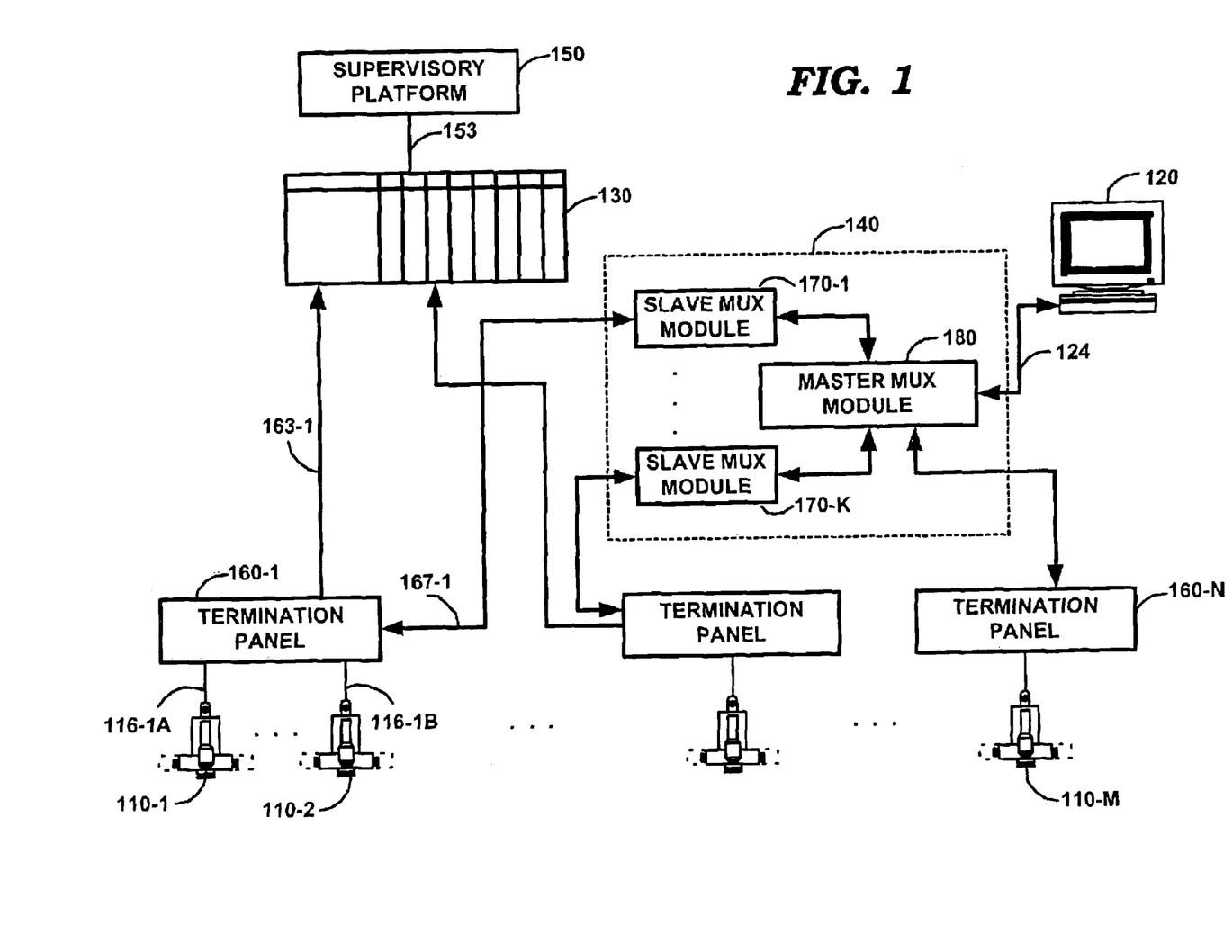

FIG. 1 is a block diagram illustrating the details of an example control system in a manufacturing plant not implementing at least some aspects of the present invention. The embodiments below are described with reference to HIGHWAY ADDRESSABLE REMOTE TRANSDUCER (HART) protocol merely for illustration. However, various aspects of the present invention can be implemented using other protocols. HART protocol is described in further detail in a document entitled, "HART Field Communications Protocol Specification HCF_SPEC_12 Rev 6.0: Released on 18th Apr. 2001", available from HART Communication Foundation, 9390 Research Boulevard, Suite I_350, Austin, Tex. 78759, USA (http://www.hartcomm.org), which document is incorporated in its entirety into the present application.

The control system is shown containing HART devices 110-1 through 110-M, asset management system 120, controller block 130, HART multiplexer 140, supervisory platform 150 and termination panels 160-1 through 160-N (with M and N representing integers). Each component is described in detail below.

HART devices 110-1 through 110-M perform various operations to support control of a desired process. In addition, each of HART devices 110-1 through 110-M generates and sends a combination of 4–20 mA analog signal and digital data. The analog signal component indicates a measured variable and the digital data is generated as a response to HART commands received from asset management system 120. Each HART device 110-1 through 110-M uses the same corresponding cable to send both the analog signal component and digital data to corresponding one of termination panels 160-1 through 160-N. For example, HART device 110-1 uses cable 116-1A to send both analog component and digital data.

Each of HART devices 110-1 through 110-M may also receive a HART command (from asset management system 120) and generates a response. The same cable on which a HART command is received, may be used to send the response. Each HART device is assigned a unique address (containing a manufacturer identifier, a device type and a device number), which enables each HART command to be directed to a specific HART device and each response to be identified as originating from a specific HART device.

Each of termination panels 160-1 through 160-N receives both 4–20 mA analog component and the digital data from a corresponding one of HART devices 110-1 through 110-M. The analog component is sent directly to controller block 130 and the digital data is sent to HART multiplexer 140. Path 163-1 contains multiple physical lines, with each line transmitting analog signal component generated by the corresponding HART device. Similarly, path 167-1 also contains multiple physical lines, with each line transmitting digital data generated by (and also directed to) the corresponding HART device.

Supervisory platform 150 interfaces with various controller blocks (only one block 130 shown for conciseness) using Control Net protocol on path 153 to perform tasks such as monitoring and control (i.e., examine status information and issue commands to control a manufacturing process), configuration management (to specify the logical operation of controller block 130), and alarm management (e.g., notify users if temperature or pressure is raising to high levels). In general, a supervisory platform performs tasks related to controlling a manufacturing process sought to be implemented in a plant.

Control Net protocol is described in further detail in a document entitled, "Control Net Specification Ver 2.0", Dated Mar. 31, 1998, available from Control Net International, PMB 315, State Road 7 #F6, Boca Raton, Fla.

USA 33498_6797 (http://www.controlnet.org), and the document is incorporated in its entirety into the present application. In an embodiment, supervisory platform 150 is implemented using Experion Server, available from Honeywell Corporation (www.honeywell.com), the assignee of the subject patent application.

Controller block 130 receives 4–20 mA analog signals generated by HART devices 110-1 through 110-M and sends control signals to various control elements (in devices supporting manufacturing process, not shown) based on a corresponding predefined logic downloaded from supervisory platform 150. For example, if HART device 110-1 contains a thermometer, and a received analog signal indicates that the temperature is more than a pre-specified threshold, then controller block 130 may send a control signal (on another path, not shown) to shut-off or reduce the energy supply (which was causing the increase in temperature). The connection from controller block 130 to termination panel 160-N is not shown in the interest of clarity in FIG. 1.

The pre-defined logic includes information such as the pre-specified threshold and the format/destination of the control signal. In an embodiment, controller block 130 contains multiple input/output (I/O) cards and each I/O card may contain multiple I/O channels, for example, 8 or 16 channels. Each I/O channel may be configured either to receive or send analog signals from/to (input/output) any one of HART devices 110-1 through 110-M.

Asset management system 120 sends various HART commands to HART devices 110-1 through 110-M either to change operation or to request various pieces of information (e.g., related to status or operational capabilities such as maximum temperature supported). The HART commands may be transmitted (and responses received) using path 124. The HART commands can be used to provide various features such as calibration of HART devices, as is well known in the relevant arts.

HART multiplexer 140 operates to forward HART commands received from asset management system 120 to the corresponding HART device. Similarly, HART multiplexer 140 operates to forward responses received from HART devices to asset management system 120. HART multiplexer 140 is shown containing slave mux modules 170-1 through 170-K, and master mux module 180, with all the components implemented substantially in the form of hardware. In an embodiment, the master multiplexer and slave multiplexer(s) respectively correspond to KFD2-HMM-16 and KFD2-HMS-16 products available from Pepperl+Fuchs GmbH, Königsberger Allee 87, 68307 Mannheim, Germany.

Each of slave mux modules 170-1 through 170-K is connected to multiple lines, with each line providing connectivity to a corresponding HART device (via a corresponding termination panel). Each line is used to send and receive data to/from a corresponding HART device. When a data packet ("digital data") is received from asset management system 120 (via master mux module 180), an address field is examined to forward the data packet on the specific line. On the other hand, data packets received from HART devices are forwarded to master mux module 180.

Master mux module 180 sends each data packet received from asset management system 120 to one of slave mux modules 170-1 through 170-K or directly to a termination panel (as illustrated with reference to termination panel 160-M) based on the HART address present in the data packet. It may thus be appreciated that multiple multiplexors may be cascaded, with some multiplexers operating as both slaves and masters. Slave mux modules 170-1 through 170-K send the digital data to corresponding termination panels 160-1 through 160-N, also based on the HART address.

Only a few representative components are shown in FIG. 1 for illustration. However, a control system in a manufacturing plant may contain many more components. For example, in an embodiment, path 124 can drive up to 31 master mux modules 180. Each master mux module 180 can drive 16 slave mux modules and each slave mux module can control up to 16 HART devices, which leads to a total of 7936 HART devices.

The description is continued with reference to some example problems (or areas for improvement) of the system of FIG. 1. The manner in which such problems are addressed by various features of the present invention is described next.

3. Example Problems

One problem with embodiment of FIG. 1 is the number of components. More components generally leads to a high cost and may thus be undesirable.

Another problem is the absence of control over HART commands sent to HART devices. For example, asset management system 120 may send HART commands to HART devices when the plant is operational, and execution of such HART commands in HART devices may be undesirable. For example, a HART command may set the operational range of a signal to a particular range (e.g., for calibration) and execution of such a command may be undesirable as some other range might be necessary to support proper operation of a manufacturing process.

One more problem is the fragmentation of information across different components (e.g., asset management system 120, controller block 130 and supervisory platform 150), which may lead to several inefficiencies. For example, controller block 130 may contain the same information as that requested by asset management system 120 using a HART command, and HART devices may be forced to process the command to provide the information. In general, it is desirable to minimize overhead on HART devices.

These and other problems (opportunities) are addressed by various aspects of the present invention as described below in further detail.

4. Reducing Number of Components

Figure 2:
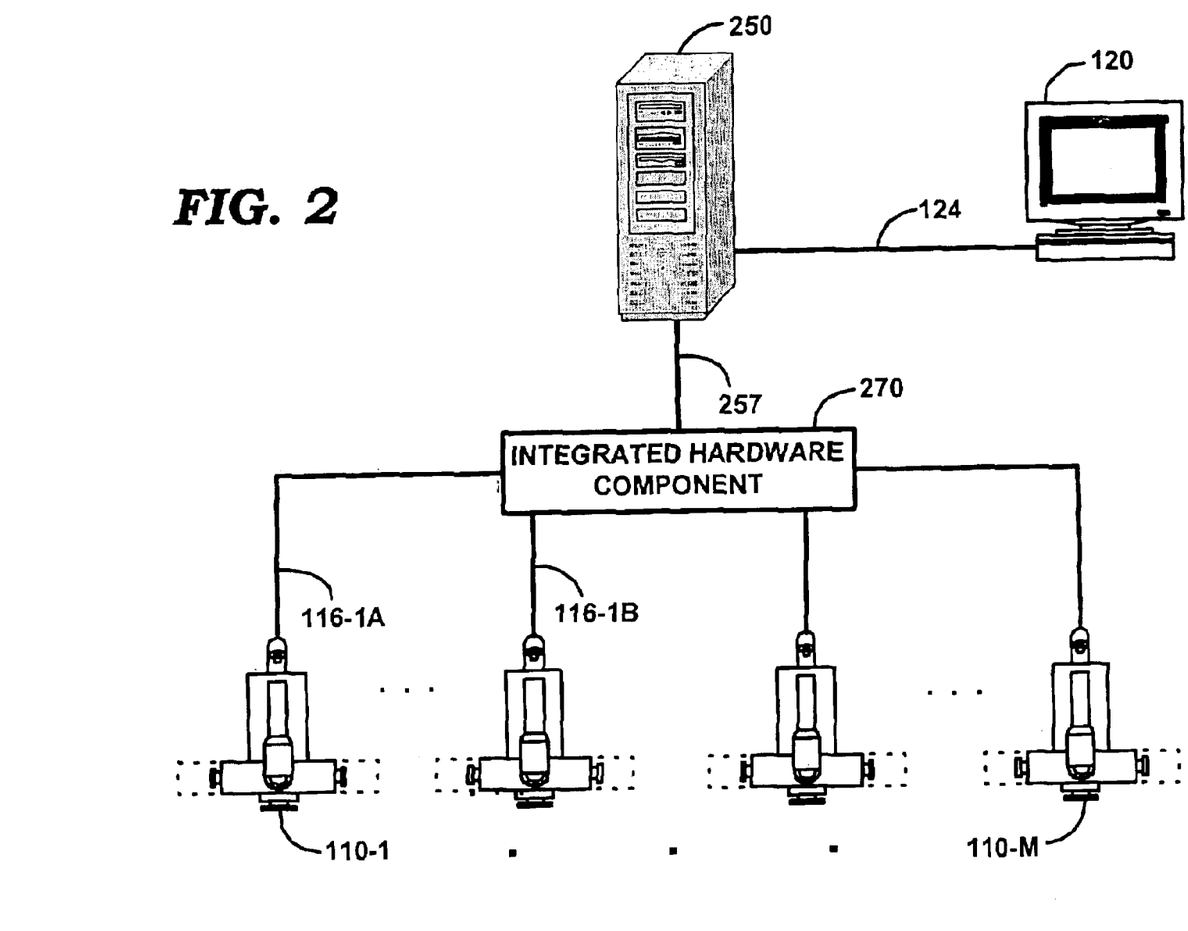
FIG. 2 is a block diagram illustrating the manner in which components provided according to various aspects of the present invention can be used to implement a manufacturing process.

FIG. 2 is a block diagram illustrating the manner in which HART devices may be controlled according to an aspect of the present invention. For illustration, the description is provided with reference to FIG. 1. However, various aspects of the present invention can be implemented in several other embodiments/environments as will be apparent to one skilled in the relevant arts based on the disclosure provided herein.

Thus, FIG. 2 is shown containing integrated software component 250 and integrated hardware component 270 operating along with asset management system 120 and HART devices 110-1 through 110-M. By comparison with FIG. 1, it may be appreciated that supervisory platform 150 and HART multiplexer 140 are integrated into integrated software component 250. Also, controller block 130 and termination panels 160-1 through 160-N are integrated into integrated hardware component 270.

Integrated hardware component 270 is shown connected to the wires (including 116-1A and 116-1B) from HART devices 110-1 through 110-M. In an embodiment, integrated hardware component 270 contains several units, with each unit containing a processor (not shown) and multiple I/O cards. Each I/O card in turn contains a port for supporting either an input channel (on which both HART commands and analog signal component is received) or an output channel (on which control signals, both analog and digital, related to manufacturing process are sent). Communication between the units is implemented using Control Net.

Integrated hardware component 270 (or I/O card therein) splits the analog signal component and HART digital data received from the HART devices (e.g., similar to termination panels 160-1 through 160-N). The digital data is forwarded to asset management system 120 as described below. The analog signal component is processed internally to implement a manufacturing process (e.g., similar to controller block 130). Integrated hardware component 270 may be implemented using several commercially available products. An embodiment of integrated hardware component 270 is implemented using Control Net compatible products such as those available from Honeywell International Incorporated, the assignee of the subject application.

Integrated software component 250 may implement the features provided by both supervisory platform 150 and HART multiplexer 140. Thus, supervisory platform 150 may implement tasks such as configuration management, event management, etc. Such implementation can be performed in a known way. In an embodiment, software instructions (and other related hardware required) are added to supervisory platform 150 to implement integrated software component 250. Accordingly, Control Net protocol (noted above) may be implemented on path 257 to support the interface between integrated hardware component 270 and supervisory platform 150 portion of integrated software component 250.

According to another aspect of the present invention, the same path 257 is also used to send commands and receive responses. Thus, integrated hardware component 270 may need to also support two logical paths—one for interface between supervisory platform 150 portion and controller block 130, and another to pass the commands/responses (to/from HART devices). The commands and responses may be tunneled (encapsulated) using Control Net protocol noted above. In an embodiment, the tunneling is implemented using unconnected Control Net message type directed to a Gateway object, and several services may be defined with the object to implement the request and response.

The description is continued with reference to the details of example implementation of integrated software component 250.

5. Integrated Software Component

Figure 3:
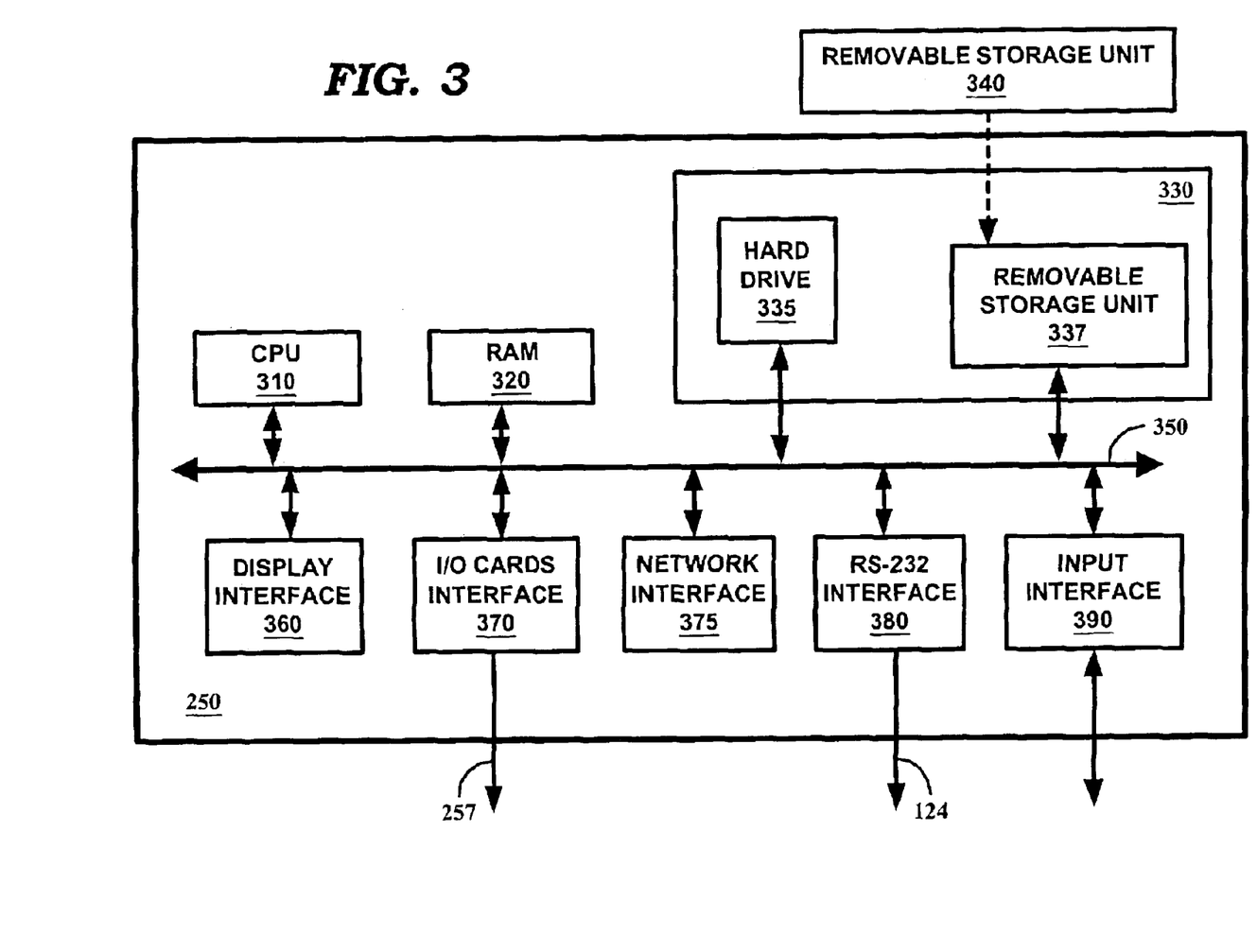
FIG. 3 is a block diagram illustrating an embodiment of integrated software component implemented substantially in the form of software.

FIG. 3 is a block diagram illustrating the details of integrated software component 250 in an embodiment of the present invention. Integrated software component 250 is shown containing processing unit (CPU) 310, random access memory (RAM) 320, storage 330, display interface 360, I/O cards interface 370, network interface 375, RS-232 interface 380, and input interface 390. Each component is described in further detail below.

Display interface 360 provides output signals (e.g., display signals representing the status information of HART devices to a display unit, not shown) representing, for example, various alarms based on status information received from HART devices. Input interface 390 (e.g., interface with a key-board and/or mouse, not shown) enables a person to provide any necessary inputs (e.g., shut off valve, change parameter values of devices, etc) to integrated software component 250. Display interface 360 and input interface 390 can be used, for example, to enable an user to interact with integrated software component 250.

RS-232 interface 380 provides the connectivity to enable integrated software component 250 to receive HART commands from and send responses to asset management system 120. RS-232 protocol represents an example protocol providing the desired connectivity. Other protocols can be used as well to provide such connectivity. Similarly, network interface 375 provides connectivity to other systems using protocols such as TCP/IP. RS-232 interface 380, network interface 375, display interface 360 and input interface 390 can be implemented in a known way.

I/O cards interface 370 provides the physical, electrical and protocol interfaces to communicate with integrated hardware component 270. In general, I/O cards interface 370 receives commands from CPU 310 for forwarding to integrated hardware component 270. I/O cards interface 370 receives responses from integrated hardware component 270 for forwarding to CPU 310. In an embodiment, I/O cards interface 370 implemented consistent with RS-232 protocol, well known in the relevant arts.

Secondary memory 330 may contain units such as hard drive 335 and removable storage drive 337. While the memory units are shown provided within integrated software component 250, it should be understood that the memory can be provided from external units as well (using technologies such as network file sharing, storage area networks, etc.).

Secondary storage 330 may store the software instructions and data, for example, to perform the operations of supervisory platform 150 and HART multiplexer 140, which enable integrated software component 250 to provide several features in accordance with the present invention. In general, secondary storage 330 provides for one or more machine readable mediums on which data and/or software instructions are stored.

Some or all of the data and instructions may be provided on removable storage unit 340, and the data and instructions may be read and provided by removable storage drive 337 to CPU 310. Floppy drive, magnetic tape drive, CD_ROM drive, DVD Drive, Flash memory, removable memory chip (PCMCIA Card, EPROM) are examples of such removable storage drive 337.

RAM 320 receives instructions and data on path 350 from storage 330, and provides the instructions to CPU 310 for execution. CPU 310 may contain one or more processors. Some of the processors can be general purpose processors which execute instructions provided from RAM 320. Some can be special purpose processors adapted for specific tasks (e.g., for processing HART commands or for alarm management). The special purpose processors may also be provided instructions from RAM 320. In general, CPU 310 reads sequences of instructions from various types of memory medium (including RAM 320, storage 330 and removable storage unit 340), and executes the instructions to provide various features of the present invention.

In this document, the term "computer program product" is used to generally refer to removable storage unit 340 or hard disk installed in hard drive 335. These computer program products are means for providing software to integrated software component 250. As noted above, CPU 310 may retrieve the software instructions from such computer readable mediums, and execute the instructions to provide various features of the present invention.

In particular, the features provided by HART multiplexer 140 are supported in many respects by executing such instructions executed within integrated software component 250. The description is continued with reference to the manner in which HART multiplexer 140 can be implemented supported by software instructions, as described below.

6. Software Multiplexer

Figure 4:
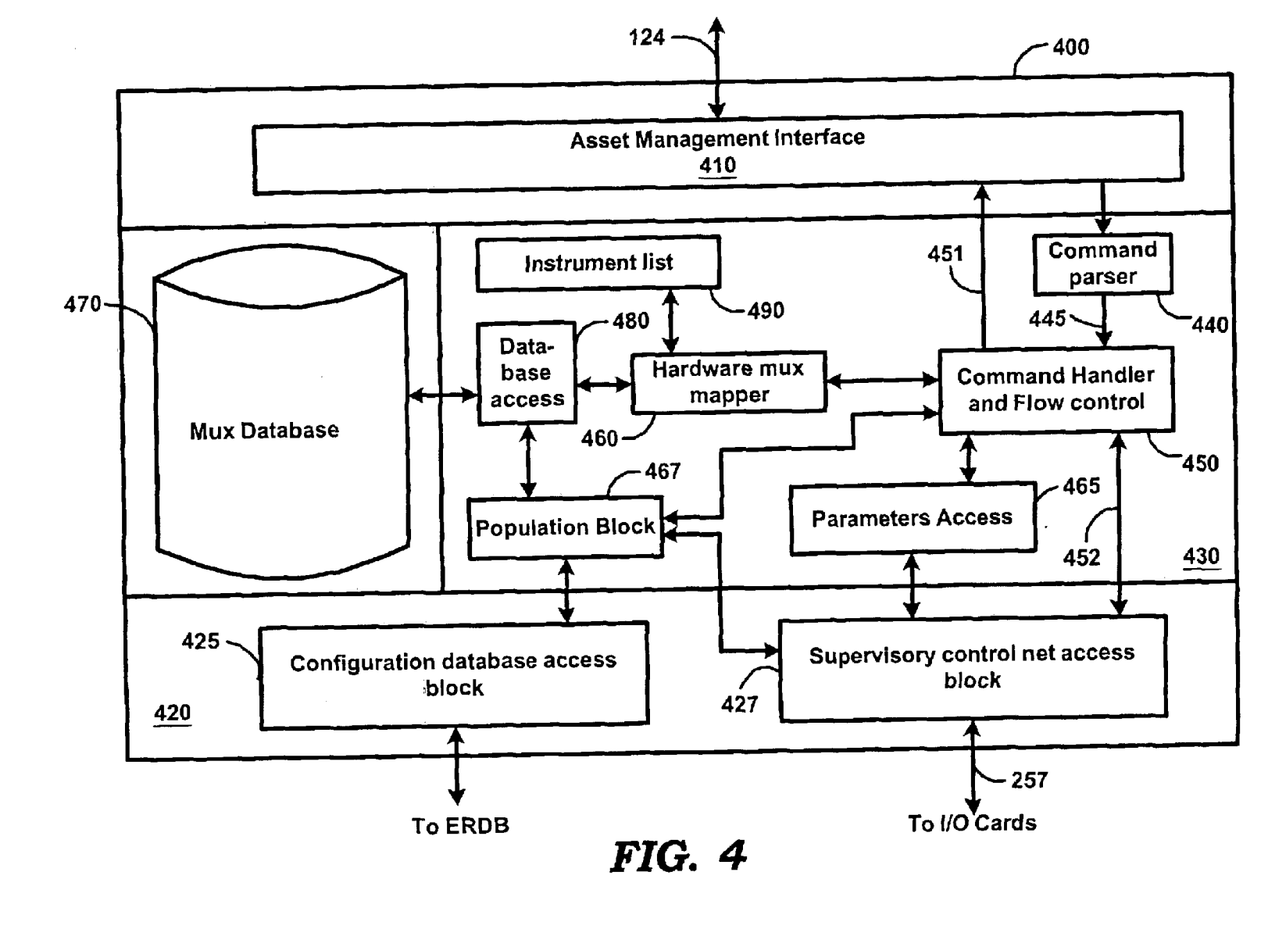
FIG. 4 is a block diagram illustrating the internal implementation of a software multiplexer in an embodiment of the present invention.

FIG. 4 is a block diagram illustrating the details of software multiplexer 400 in an embodiment of the present invention. Software multiplexer 400 emulates the operation of HART multiplexer 140. Emulation generally refers to providing similar interfaces (as HART multiplexer 140) to other interacting devices (in this case, HART devices, integrated hardware component 270 and asset management system 120), but with internal implementation changing in substantial respects. Here software multiplexer 400 is implemented in the form of software and can be extended to provide features not provided by hardware implementations, as described below with several examples.

For illustration, software multiplexer 400 is described with reference to FIGS. 1 and 2. However, software multiplexer 400 may be implemented in other environments as well. Software multiplexer 400 is logically divided into three layers—asset management interface 410, engineering repository database (ERDB) and supervisory control net access 420, and mux emulation and database 430. The operation of each layer is described below.

First it is helpful to understand that ERDB refers to a configuration database (e.g., provided externally, not shown), which maintains various pieces of information on configuration of different elements of a control system. For example, the information may specify a number of HART multiplexers integrated software component 250 may need to simulate, the specific channels (ports) of integrated hardware component 270 on which HART enabled devices are present, etc.

Continuing with reference to FIG. 4, ERDB and supervisory control net access 420 is shown containing two modules—configuration database access block 425 and supervisory control net access block 427. Mux emulation and database 430 is shown containing command parser 440, command handler and flow control 450, hardware mux mapper 460, parameter access 465, population block 467, MUX database 470, database access 480, and instrument list 490. Each module is described in detail below.

Asset management interface 410 may receive HART commands from and send responses to asset management system 120 via RS-232 interface 380. Asset management interface 410 sends the received HART commands to command parser 440. The responses to be forwarded may be received from command handler and flow control block 450. Configuration database access block 425 enables access to ERDB. The interface with ERDB may be implemented using any compatible protocols (such as DCOM protocol available from Microsoft).

Supervisory control net access block 427 passes the HART commands received from command handler and flow control 450 to I/O cards interface 370. Similarly, supervisory control net access block 427 may also pass the corresponding responses received from HART devices to command handler and flow control 450. In addition, supervisory control net access block 427 may enable access of various parameters available in integrated hardware component 270.

Population block 467 retrieves configuration related information from ERBD and takes appropriate actions. For example, the retrieved information may indicate the number of HART multiplexers which may need to be simulated by software multiplexer 400, and the number of I/O cards and ports contained in integrated hardware component 270. The information is then passed to command handler and flow control 450, which passes commands consistent with the received information.

In addition, population block 467 may interface with supervisory control net access block 427 to retrieve the various data related to HART devices. For example, the machine address on each port/channel may be determined, and a mapping of the machine address to port number (and vice versa) may be stored in mux database 470 by interfacing with database access 480. In an embodiment, population block 467 retrieves the information from ERDB at startup and performs the related operations as described.

Command parser 440 receives HART commands from asset management interface 410, parses the HART commands to ensure consistency with a pre-specified syntax, and passes the commands to command handler and flow control 450 on path 445.

Mux database 470 provides storage for storing and accessing various pieces of information. In an embodiment, mux database 470 stores HART address, I/O card and channel address on which the HART device is connected, name of the HART device, long form addressing, the specific multiplexer to which the HART device is connected (assuming software multiplexer 400 emulates more than one multiplexer), etc. Mux database 470 may be implemented as a non-volatile memory such that at least some of the data is available again even if integrated software component 250 in re-initialized (e.g., powered up). Database access 480 controls and coordinates various accesses (read and write) to mux database 470. Database access 480 needs to be implemented consistent with the implementation of mux database 470.

Instrument list 490 represents a list of HART devices presently served by software multiplexer 400 (for each multiplexer being emulated). The list may contain an index for each entry and the HART address for the corresponding HART device. Instead of using the entire HART address in sending commands, asset management system 120 may conveniently use the index to specify the specific HART device to which a command is directed. As noted above, a HART address may include manufacturer identifier, device type identifier and device number. Data representing instrument list 490 may be stored in mux database 470 as well.

Hardware mux mapper 460 maps each address (either in the form of machine address or an index) to a corresponding I/O card and port number on which the corresponding HART device is present. If the address is provided in the form of an index, instrument list 490 may be examined to perform the mapping. The data available in mux database 470 may be used for such a mapping. The requests for mapping are generally received from command handler and flow control 450.

Hardware mux mapper 460 supports various other commands directed to instruments list 490. For example, a command to provide an entire list may be received (from command handler and flow control 450), and hardware mux mapper 460 provides the corresponding data. In addition, commands to alter the list (e.g., deletion of a specific entry) may also be appropriately supported by interfacing with instrument list 490.

Command handler and flow control 450 generates the response (by interfacing with other components) for each received command, and passes the response to asset management interface 410 on path 451. To ensure that a response is generated for each command and to ensure that the response is generated with the appropriate headers, etc., command handler and flow control 450 maintains a pending list of commands (e.g., in RAM 320). Each command may be directed either to software multiplexer 400 or a HART device, and command handler and flow control 450 examines the command for appropriate processing. The destination may be determined by examining the address contained in the received command.

The specific channel and I/O card on which to forward a command may be determined by interfacing with hardware mux mapper 460. Command handler and flow control 450 sends the HART command, I/O card and channel address to supervisory control net access block 427 on path 452, which then sends the HART command to corresponding HART device. Command handler and flow control 450 may send a status message indicating that the command is being processed after sending the command to the I/O card. Another status message may be received from the I/O card if the channel address is valid and the command is successfully forwarded to the corresponding HART device.

When a command is forwarded to supervisory control net access block 427, a handle (a unique identifier of the command) may be received. The same handle may be received along with a corresponding response, and thus a response may be associated with a command sent earlier. Thus, if multiple asset management systems are present or if software multiplexer 400 emulates multiple HART multiplexers, the handle may be used to associate the response with the correct command. The handle may be used to query the status of any pending command at supervisory control net access block 427.

In an embodiment, a queue of pending commands is maintained associated with each I/O card and only one command is sent to an I/O card at a time and the remaining commands to the I/O card are queued until response is received for the earlier command. In other words, a next command is sent only after a response is received for a present command (or a timer expires, in which case a response is deemed not to be received for the present command). If the same command as a pending command is received, command handler and flow control 450 may send a wait signal via asset management interface 410 on path 451, and ignore the received command. Otherwise, the response for the command is sent on path 451 after retrieving the corresponding information.

Command handler and flow control 450 may receive various commands related to a list of HART devices presently served by HART multiplexer 140. For example, a command may request a list (with an index associated with each HART device), and another command may request deletion of an item in the list. Command handler and flow control 450 interfaces with hardware mux mapper 460 to process such commands. In general, a response is received from hardware mux mapper 460 associated with each such command, and command handler and flow control 450 sends the response to asset management system 120 using asset management interface 410.

Parameters access 465 enables efficient processing of commands when the information for such commands may be available within integrated hardware component 270. The embodiment of FIG. 1 may forward such commands to the corresponding HART device, and it may be desirable not to send too many commands to HART devices. An aspect of the present invention minimizes the number of commands sent to HART devices as described below in further detail.

7. Responding to Commands While Minimizing Accesses to Hart Devices

Figure 5:
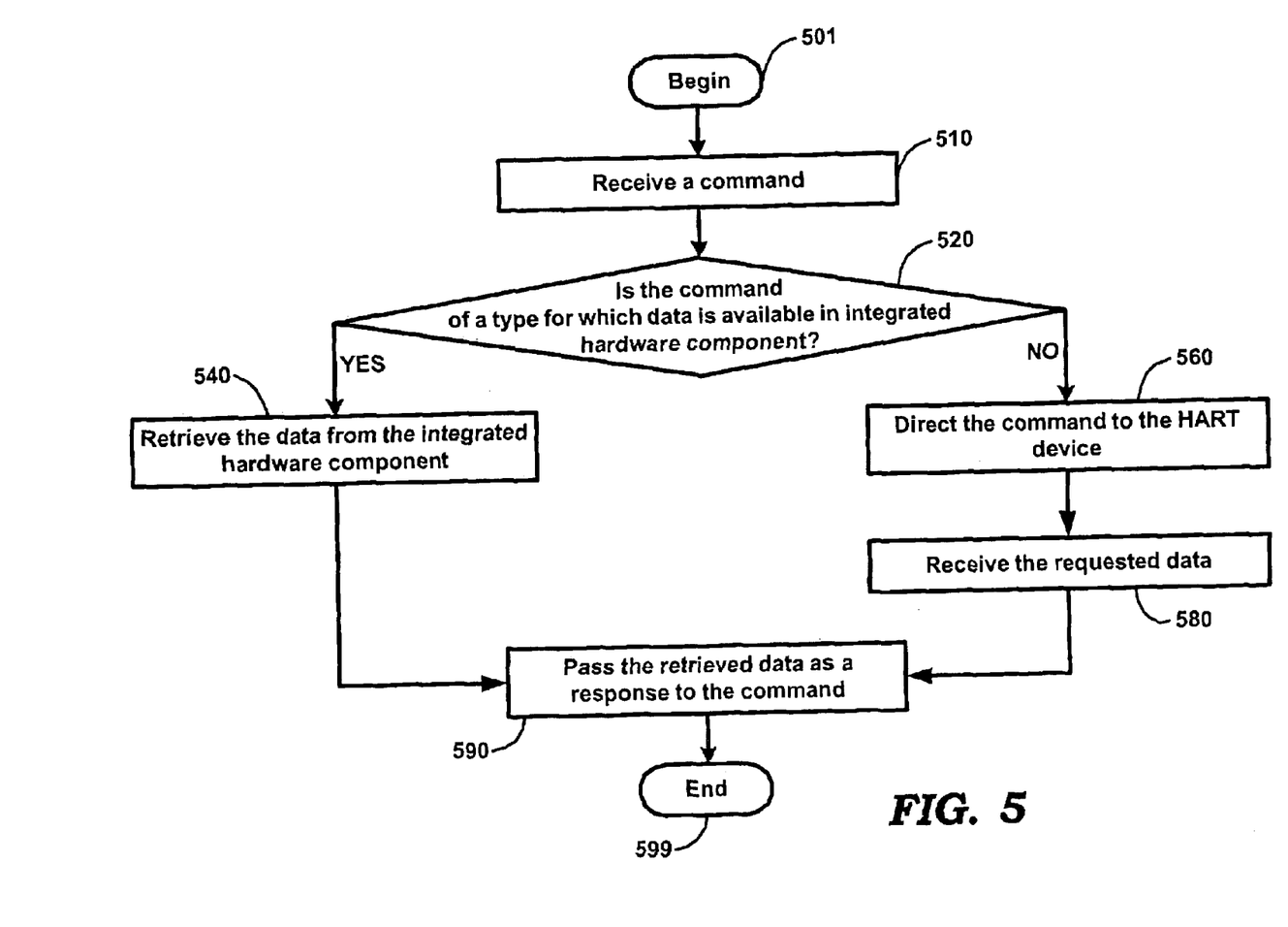
FIG. 5 is a flowchart illustrating the manner in which the number of HART commands to HART devices can be minimized in an embodiment of the present invention.

FIG. 5 is a flowchart illustrating a method by which commands may be processed while minimizing accesses to Hart devices in an embodiment of the present invention. The method is described with reference to FIG. 4 for illustration. However, the method can be implemented with other embodiments as well. The method begins in step 501 in which control passes to step 510.

In step 510, command parser 440 receives a command from asset management interface 410, and passes the received command to command handler and flow control 450.

In step 520, command handler and flow control 450 determines whether the command is of a type for which data is available in integrated hardware component 270. For example, command 0 of HART protocol relates to getting device specific data such as manufacturer identifier, device type, etc., which may not change for a device and is available in integrated hardware component 270. On the other hand, command 33 is for getting data on dynamic variables (i.e., data that can change). For commands such as 0, control passes to step 540. Or else control passes to step 560.

In step 540, command handler and flow control 450 fetches (from integrated hardware component 270) the data corresponding to the command. Pre-existing supervisory commands may be used for such a retrieval. Control then passes to step 590. If the data is not available in integrated hardware component 270, the command may be directed to the specific HART device (as in step 560 below).

In step 560, command handler and flow control 450 directs (forwards) the command to the HART device. Control Net protocol on path 257 may be used for such forwarding.

In step 580, the data is received in response to the command forwarded in step 540 or 560. In step 590, command handler and flow control 450 passes the retrieved data as a response to the command. The method ends in step 599.

Accordingly, if the requested data is available in integrated hardware component 270 itself, software multiplexer 400 may retrieve the data without accessing data from the HART device at least for some commands. At least for commands which request information that does not change often or which would be updated in integrated hardware component 270, the approach of FIG. 5 can be used to minimize the number of accesses to the HART devices. As a result, the bandwidth available in the path to HART device may be optimally utilized, in addition in minimizing the overhead on HART devices.

In addition, due to the flexibility generally available in software based implementations, software multiplexer 400 may prevent certain types of commands from being forwarded further as described below with an example below.

8. Preventing Forwarding of Some Commands

Figure 6:
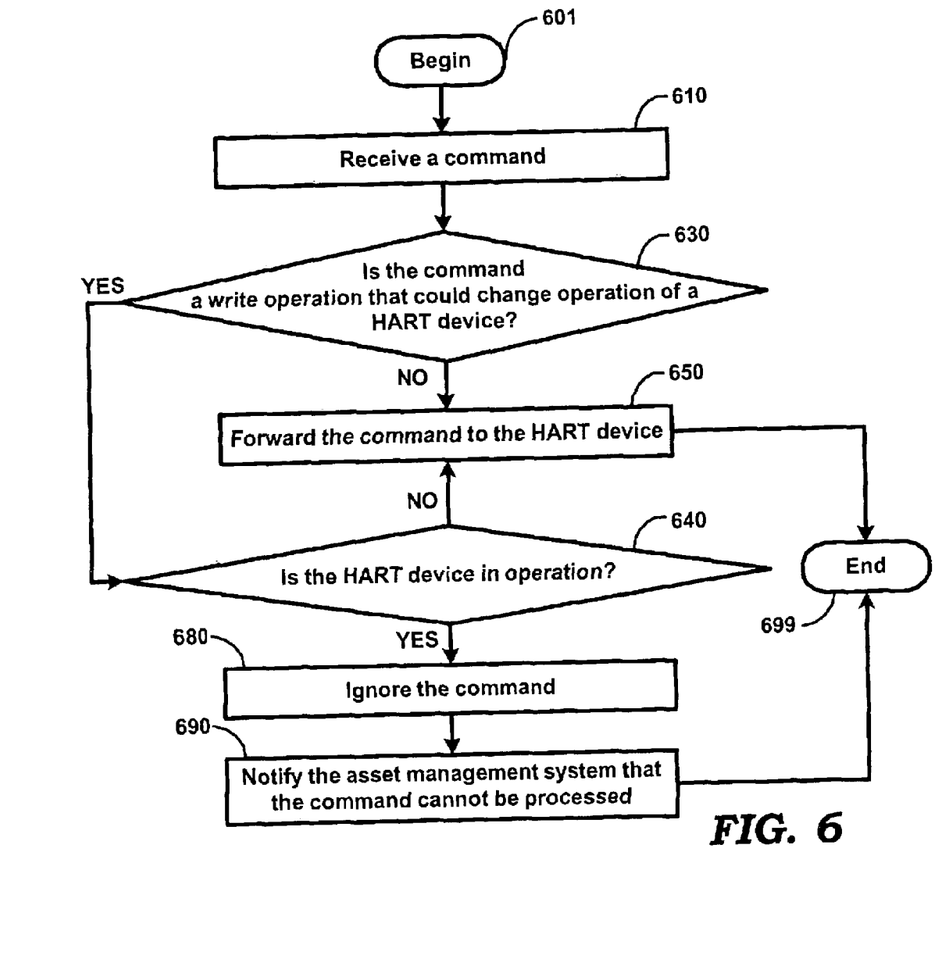
FIG. 6 is a flowchart illustrating the manner in which commands, which are desired to be blocked, can be blocked in an embodiment of the present invention.

FIG. 6 is a flow-chart illustrating the manner in which software multiplexer 400 may prevent forwarding of certain HART commands in an embodiment of the present invention. The method is described with reference to the components of FIG. 4 for illustration. However, the method can be implemented in several other embodiments as well. The method begins in step 601, in which control immediately passes to step 610.

In step 610, software multiplexer 400 receives a command directed to a HART device from asset management system 120. It may be desirable not to forward some type of commands to the HART devices. For example, if a command is a write command that changes the operation of the corresponding HART device and if the HART device is presently operational, it may be desirable to prevent forwarding the command further. The manner in which such prevention is attained is described below in further detail.

In step 630, command handler and flow control 450 determines whether the command is a write operation that could change operation of the corresponding HART device. If such is the case, control passes to 640, or else control passes to step 650.

In step 640, command handler and flow control 450 checks whether the HART device (to which the command is directed) is in operation. The operational status of a HART device may be checked by interfacing with integrated hardware component 270 using Control Net, in a known way. If the HART device is operational, control passes to step 680, or else control passes to step 650.

In step 650, command handler and flow control 450 forwards the command to the HART device (specified in the destination address of the command). Control then passes to step 699, in which the method ends.

In step 680, command handler and flow control 450 may ignore the command (i.e., not forward). In step 690, a notification may be sent to asset management system 120 that the command cannot be processed. The notification can be sent on path 124 using any known protocols. Control then passes to step 699.

Thus, using an approach similar to that described above with respect to FIG. 6, software multiplexer 400 may prevent any undesirable commands from being forwarded to the HART devices. The approach underlying the flow-chart generally needs to be modified consistent with the specific type of command (situations) which need to be blocked. Such blocking may be conveniently implemented as software multiplexer 400 is implemented substantially in the form of software.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A control system providing communication between an asset management system and a plurality of addressable remote devices, wherein said plurality of addressable remote devices are used to implement a manufacturing process, each of said plurality of addressable remote device being connected by a corresponding one of a plurality of paths, said control system comprising:

a software multiplexer coupled to receive a plurality of commands for said plurality of addressable remote devices from said asset management system, said software multiplexer determining the specific one of said plurality of paths on which each command is to be forwarded, said software multiplexer forwarding each of said plurality of commands on the determined one of said plurality of paths to a corresponding one of said plurality of addressable remote devices.

2. The control system of claim 1, wherein said plurality of addressable remote devices are connected to a controller block by said plurality of paths, wherein said controller block receives signals on said plurality of paths representing the status of said addressable remote devices and implements said manufacturing process, said control system further comprising a supervisory software program arranged to operate in conjunction with said controller block.

3. The control system as claimed in claim 2, wherein said supervisory software program and said software multiplexer are integrated in a single digital processing unit.

4. The control system of claim 3, further comprising an integrated hardware component comprising said controller block, wherein said integrated hardware component is designed to receive said plurality of commands from said software multiplexer and forward said plurality of commands to said plurality of addressable remote devices using said plurality of paths.

5. The control system of claim 4, wherein said software multiplexer forwards said plurality of commands to said integrated hardware component using Control Net protocol.

6. The control system of claim 5, wherein said integrated hardware component receives a plurality of responses corresponding to said plurality of commands, and forwards said plurality of responses to said software multiplexer, said software multiplexer forwarding said plurality of responses to said asset management system.

7. The control system of claim 3, wherein said software multiplexer comprises a non-volatile memory storing a mapping of addresses of said plurality of addressable remote devices to corresponding plurality of paths.

8. The control system of claim 7, wherein said software multiplexer comprises a population block storing said mapping in said non-volatile memory when said single unit is initialized.

9. The control system of claim 3, wherein said software multiplexer determines whether the data to generate a response to a first command is available in said controller block, wherein said software multiplexer retrieves said data from said controller block if said data is available in said controller block.

10. The control system of claim 9, wherein said software multiplexer sends said response to said asset management system without accessing a corresponding device to which said first command is directed to.

11. The control system of claim 10, wherein said software multiplexer retrieves said data from said controller block using Control Net.

12. The control system of claim 3, wherein said software multiplexer receives a second command and determines whether execution of said second command changes a configuration of a second Addressable remote device to which said second command is directed, said software multiplexer blocking said second command if said second addressable remote device is operational.

13. The control system of claim 1, wherein each of said plurality of addressable remote devices comprises a Highway Addressable Remote Transducer (HART) device.

14. A computer readable medium carrying one or more sequences of instructions for causing a system to emulate a multiplexer, said multiplexer being provided between an asset management system and a plurality of addressable remote devices, wherein execution of said one or more sequences of instructions by one or more processors contained in said system causes said one or more processors to perform the actions of:

receiving a plurality of commands from said asset management system; and forwarding each of said plurality of commands to a corresponding one of said plurality of addressable remote devices.

15. The computer readable medium of claim 14, further comprising:

storing in a non-volatile memory a mapping of addresses of said plurality of addressable remote devices to corresponding plurality of paths to which said plurality of addressable remote devices are respectively connected.

16. The computer readable medium of claim 15, wherein said storing is performed when said system is initialized.

17. The computer readable medium of claim 14, further comprising:

determining whether the data to generate a response to a first command is available in a controller block, wherein said controller block receives signals on said plurality of paths representing the status of said addressable remote devices and implements said manufacturing process; and retrieving said data from said controller block if said data is available in said controller block.

18. The computer readable medium of claim 17, further comprising sending said response to said asset management system without accessing a corresponding addressable remote device to which said first command is directed to.

19. The computer readable medium of claim 18, wherein said software multiplexer retrieves said data from said controller block using Control Net.

20. The computer readable medium of claim 14, further comprising:

receiving a second command;

determining whether execution of said second command changes a configuration of a second Addressable remote device to which said second command is directed; and blocking said second command if said second Addressable remote device is operational and if execution of said second command changes said configuration.

21. The computer readable medium of claim 14, wherein each of said plurality of addressable remote devices comprises a Highway Addressable Remote Transducer (HART) device.

22. A multiplexer provided between an asset management system and a plurality of Addressable remote devices, said multiplexer comprising:

an asset manager interface receiving a plurality of commands from said asset management system; and an emulation block implemented in the form of software instructions, said emulation block receiving each of said plurality of commands and determining a specific one of said plurality of Addressable remote devices to forward the corresponding command, and forwarding the corresponding command to said specific one of said plurality of addressable remote devices.

23. The multiplexer of claim 22, further comprising:

a non-volatile memory storing a mapping of addresses of said plurality of Addressable remote devices to corresponding plurality of paths, wherein each of said plurality of paths is connected to a corresponding one of said plurality of Addressable remote devices.

24. The multiplexer of claim 23, wherein said emulation block comprises a population block which generates and stores said mapping when said multiplexer is initialized.

25. The multiplexer of claim 22, further comprising:

a command handler and flow control block determining whether the data to generate a response to a first command is available in a controller block connected to said plurality of Addressable remote devices; and a parameter access block retrieving said data from said controller block if said data is available in said controller block.

26. The multiplexer of claim 25, wherein said command handler and flow control sends said response to said asset management system without accessing a corresponding Addressable remote device to which said first command is directed.

27. The multiplexer of claim 26, wherein said emulation block retrieves said data from said controller block using Control Net.

28. The multiplexer of claim 25, wherein said command handler and flow control block receives a second command and determines whether execution of said second command changes a configuration of a second Addressable remote device to which said second command is directed, and blocks said second command if said second addressable remote device is operational and if execution of said second command changes said configuration.

29. The multiplexer of claim 22, wherein each of said plurality of addressable remote devices comprises a Highway Addressable Remote Transducer (HART) device.

* * * * *